(12) United States Patent
Adireddy

(10) Patent No.: US 11,288,957 B2
(45) Date of Patent: Mar. 29, 2022

(54) SYSTEM AND METHOD FOR DETECTING ONE WAY DRIVING USING A HEAT MAP

(71) Applicant: Continental Automotive Systems, Inc., Auburn Hills, MI (US)

(72) Inventor: Ganesh Adireddy, Bloomfield Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 72 days.

(21) Appl. No.: 16/710,325

(22) Filed: Dec. 11, 2019

(65) Prior Publication Data
US 2021/0183239 A1    Jun. 17, 2021

(51) Int. Cl.
*G08G 1/16* (2006.01)
*G08G 1/01* (2006.01)

(52) U.S. Cl.
CPC ......... *G08G 1/0137* (2013.01); *G08G 1/0125* (2013.01); *G08G 1/164* (2013.01)

(58) Field of Classification Search
CPC ..... G08G 1/0137; G08G 1/0125; G08G 1/164
See application file for complete search history.

(56) References Cited

U.S. PATENT DOCUMENTS

| 2015/0077273 A1 | 3/2015 | Alshinnawi et al. |
| 2019/0213873 A1 | 7/2019 | Adireddy et al. |
| 2020/0135033 A1* | 4/2020 | Switkes ............ G08G 1/22 |

FOREIGN PATENT DOCUMENTS

DE    102016203746 A1 *  9/2017  ....... G08G 1/096783

OTHER PUBLICATIONS

English_Translation_DE102016203746A1 (Year: 2016).*
International Search Report and the Written Opinion of the International Searching Authority dated Mar. 30, 2021 for the counterpart PCT Application No. PCT/20120/070897.

* cited by examiner

*Primary Examiner* — Peter D Nolan
*Assistant Examiner* — Ashley L Redhead, Jr.

(57) ABSTRACT

A method for determining wrong direction using a heat map includes: receiving sensor data from at least one sensor in communication with a hardware processor. The method also includes identifying a plurality of traffic participants and determining at least one attributes including at least a direction of travel. The method also includes generating the heat map based on the at least one attributes of the plurality of traffic participants, where the heat map indicates at least travel direction of the surface area. The method also includes receiving sensor data indicating a direction of travel and location of a first vehicle; and comparing the sensor data of the first vehicle with the heat map to determine when the first vehicle is traveling in an opposing direction to the travel direction of the heat map.

12 Claims, 10 Drawing Sheets

SYSTEM AND METHOD FOR DETECTING ONE WAY DRIVING USING A HEAT MAP

TECHNICAL FIELD

This disclosure relates to a system and a method for generating a traffic heat map associated with an area, for example, an intersection, road or highway.

BACKGROUND

Traffic on roads includes traffic participants, such as, but not limited to, vehicles, streetcars, buses, pedestrians, and any other moving object using public roads and walkways or stationary objects such as benches and trash cans. Organized traffic generally has well established priorities, lanes, right-of-way, and traffic control intersections. Traffic may be classified by type: heavy motor vehicle (e.g., car and truck), other vehicle (e.g., moped and bicycle), and pedestrian. It is desirable to have a system and method for monitoring the traffic to detect driving along roadways.

SUMMARY

One general aspect includes a method for determining wrong direction using a heat map of a surface area, the method including: receiving, at a hardware processor, sensor data from at least one sensor in communication with the hardware processor and positioned such that the surface area is within a field of view of the at least one sensor. The method also includes identifying, at the hardware processor, a plurality of traffic participants and determining at least one attributes including at least a direction of travel. The method also includes generating, at the hardware processor, the heat map based on the at least one attributes of the plurality of traffic participants, where the heat map indicates at least travel direction of the surface area. The method also includes receiving, at a hardware processor, sensor data indicating a direction of travel and location of a first vehicle. The method also includes comparing, with the hardware processor the sensor data of the first vehicle with the heat map to determine when the first vehicle is traveling in an opposing direction to the travel direction of the heat map.

Implementations may include one or more of the following features.

The method further including providing a warning to traffic participants proximate to the surface area.

The method further including providing a warning to the driver of the first vehicle.

The method further including updating the heat map to reflect a new second direction of travel based upon a second plurality of traffic participants traveling in the opposing direction of travel.

The method further including multiple zones of the surface area within the field of view, where each zone is assigned a direction of travel on the heat map.

The method further including determining which of the multiple zones the first vehicle is located in based upon the sensor data and where the direction of travel of the first vehicle is compared to the zone data on the heat map that corresponds to the vehicle location.

Another general aspect includes a traffic monitoring system for generating a heat map of a surface area, the system including: a hardware processor; and hardware memory in communication with the hardware processor, the hardware memory storing instructions that when executed on the hardware processor cause the hardware processor to perform operations as described herein. The traffic monitoring system also includes receiving, at a hardware processor, sensor data from at least one sensor in communication with the hardware processor and positioned such that the surface area is within a field of view of the at least one sensor. The traffic monitoring system also includes identifying, at the hardware processor, a plurality of traffic participants and determining at least one attributes including at least a direction of travel. The traffic monitoring system also includes generating, at the hardware processor, the heat map based on the at least one attributes of the plurality of traffic participants, where the heat map indicates at least travel direction of the surface area. The traffic monitoring system also includes receiving, at a hardware processor, sensor data indicating a direction of travel and location of a first vehicle. The traffic monitoring system also includes comparing, with the hardware processor the sensor data of the first vehicle with the heat map to determine when the first vehicle is traveling in an opposing direction to the travel direction of the heat map.

Implementations may include one or more of the following features.

The system further including the hardware processor to perform operations of providing a warning to traffic participants proximate to the surface area.

The system further including hardware processor to perform operations of providing a warning to the driver of the first vehicle.

The system further including hardware processor to perform operations of updating the heat map to reflect a new second direction of travel based upon a second plurality of traffic participants traveling in the opposing direction of travel.

The system further including defining multiple zones of the surface area within the field of view, where each zone is assigned a direction of travel on the heat map.

The system further including the hardware processor configured to perform operations of determining which of the multiple zones the first vehicle is located in based upon the sensor data and where the direction of travel of the first vehicle is compared to the zone data on the heat map that corresponds to the vehicle location.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Autonomous and semi-autonomous driving has been gaining interest in the past few years. To increase transportation safety of autonomous and semi-autonomous vehicles, it is important to have an accurate idea of the infrastructure (i.e., roads, lanes, traffic signs, crosswalks, sidewalks, light posts, buildings, etc.) that is being used by these vehicles, and know the active participants (e.g., vehicles, pedestrians, etc.) using the infrastructure. A vehicle-traffic system as described below quantifies this information as a heat map, which may be used by the autonomous and semi-autonomous vehicles to improve driving accuracy and thus transportation safety.

Figure 1:
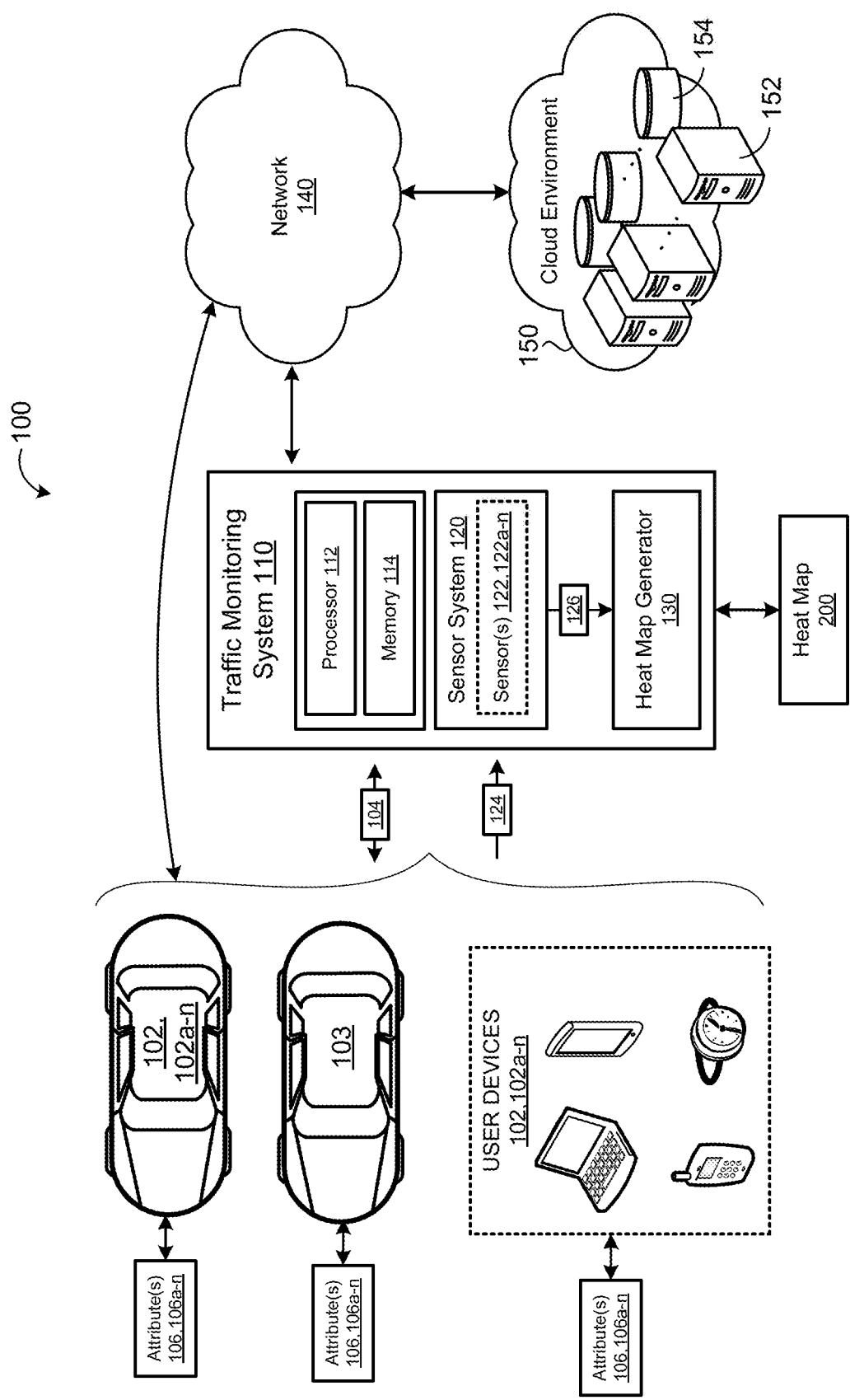
FIG. 1 is a schematic view of an exemplary overview of a vehicle-traffic system.
Figure 2:
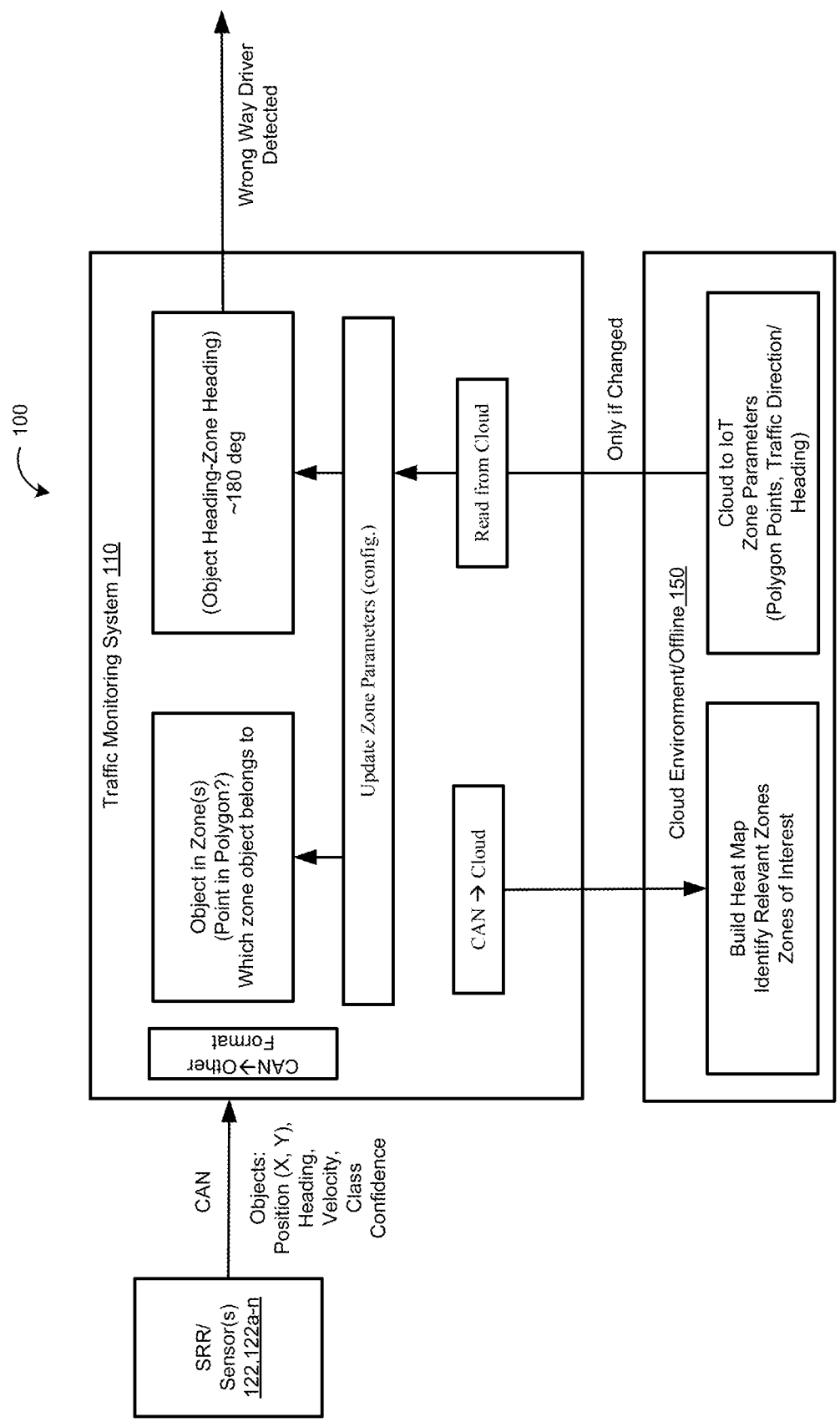
FIG. 2 is a schematic view of an alternate exemplary configuration for the traffic monitoring system of FIG. 1.
Figure 3A:
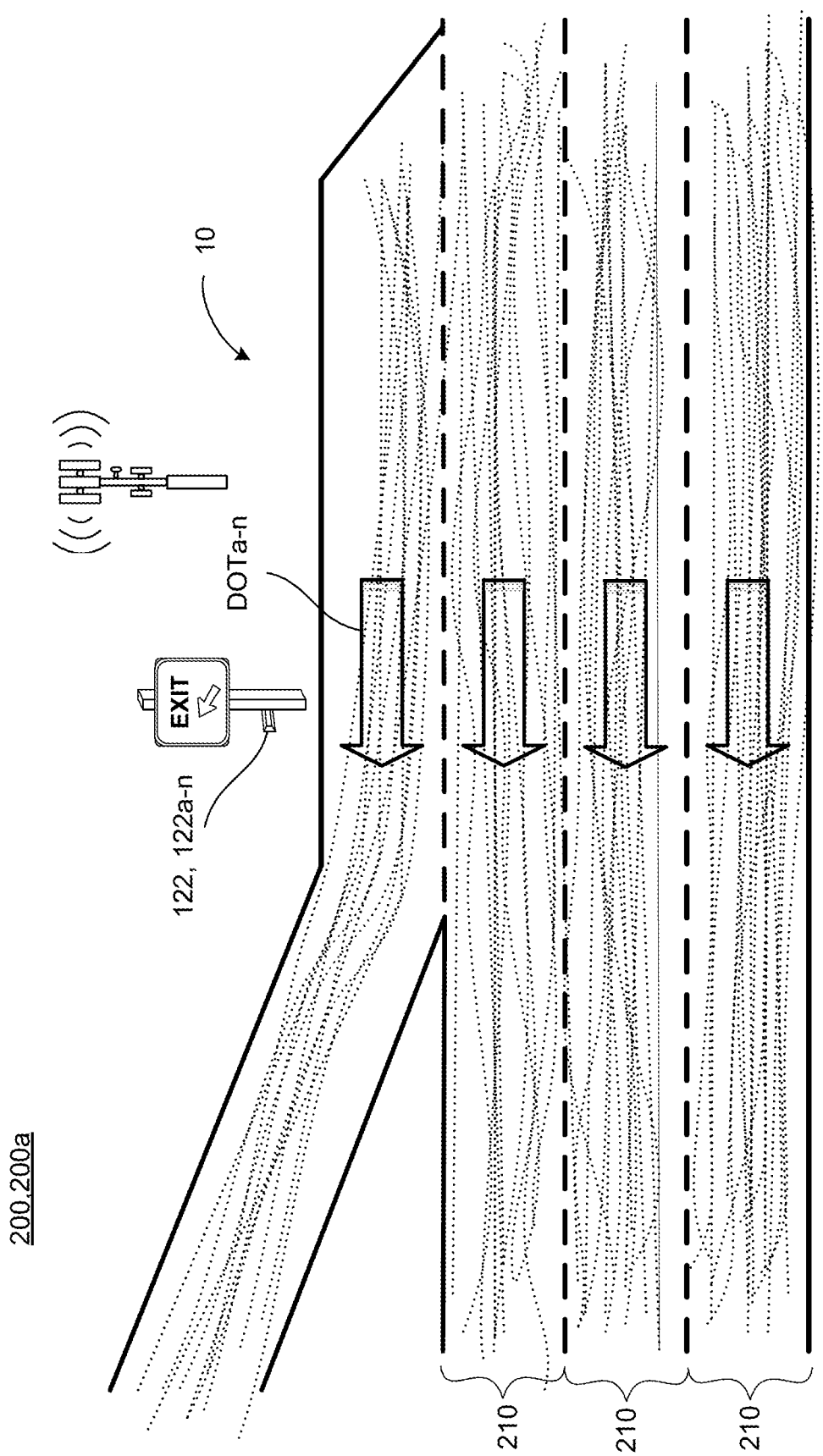
FIG. 3A is a schematic view of an exemplary heat map in a first traffic situation.
Figure 3B:
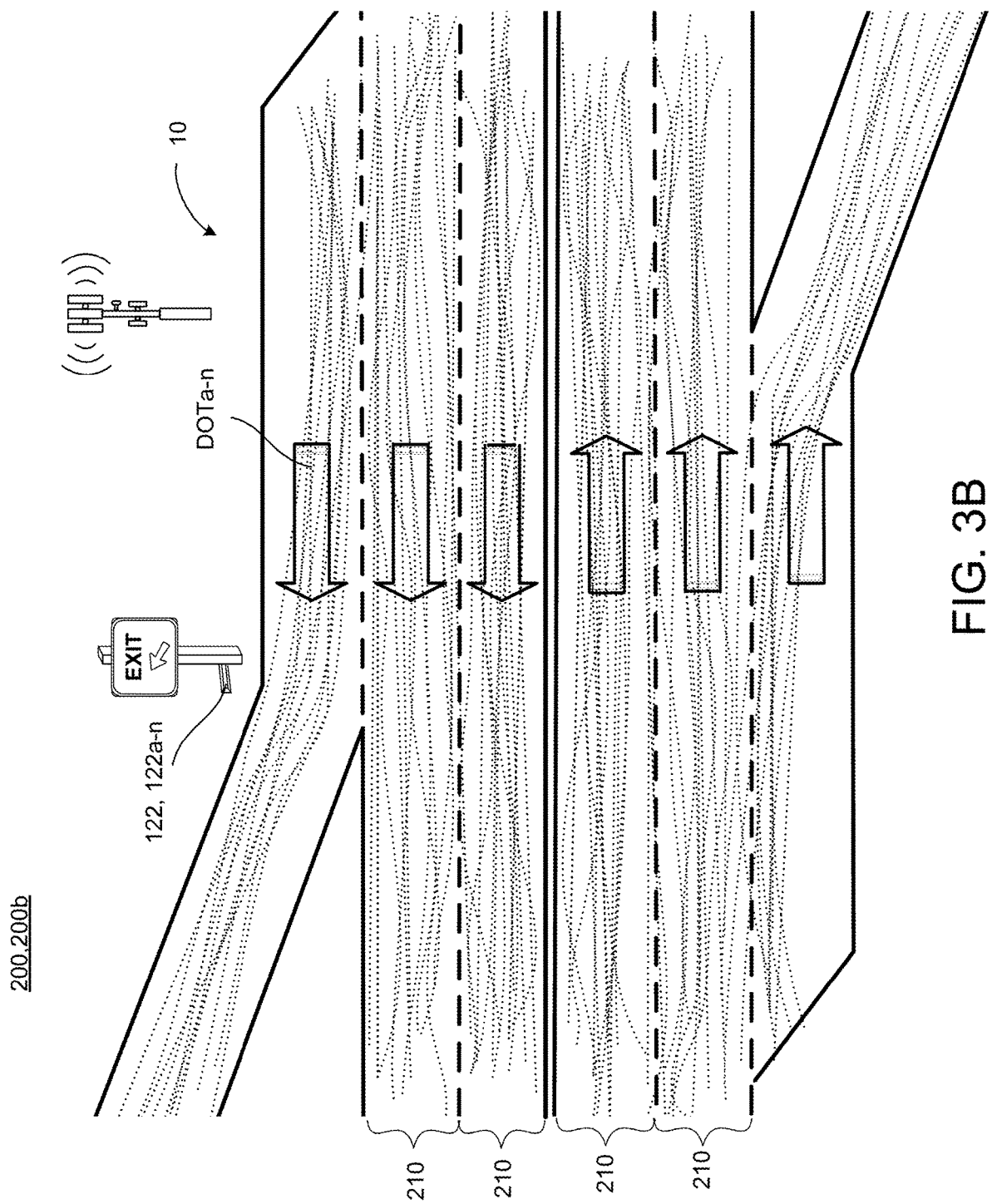
FIG. 3B is a schematic view of an exemplary heat map in a second traffic situation.
Figure 3C:
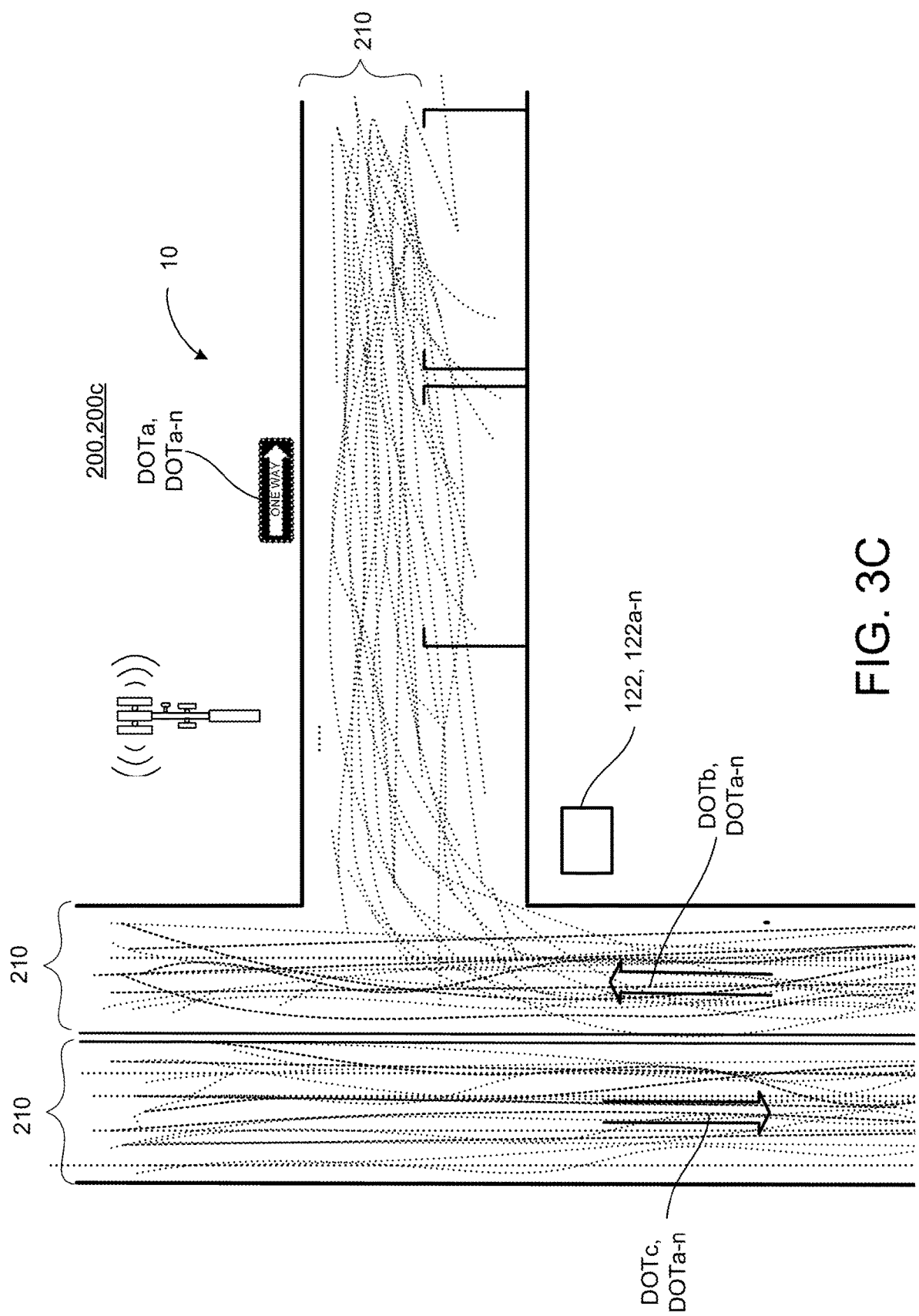
FIG. 3C is a schematic view of an exemplary heat map in a third traffic situation.
Figure 4A:
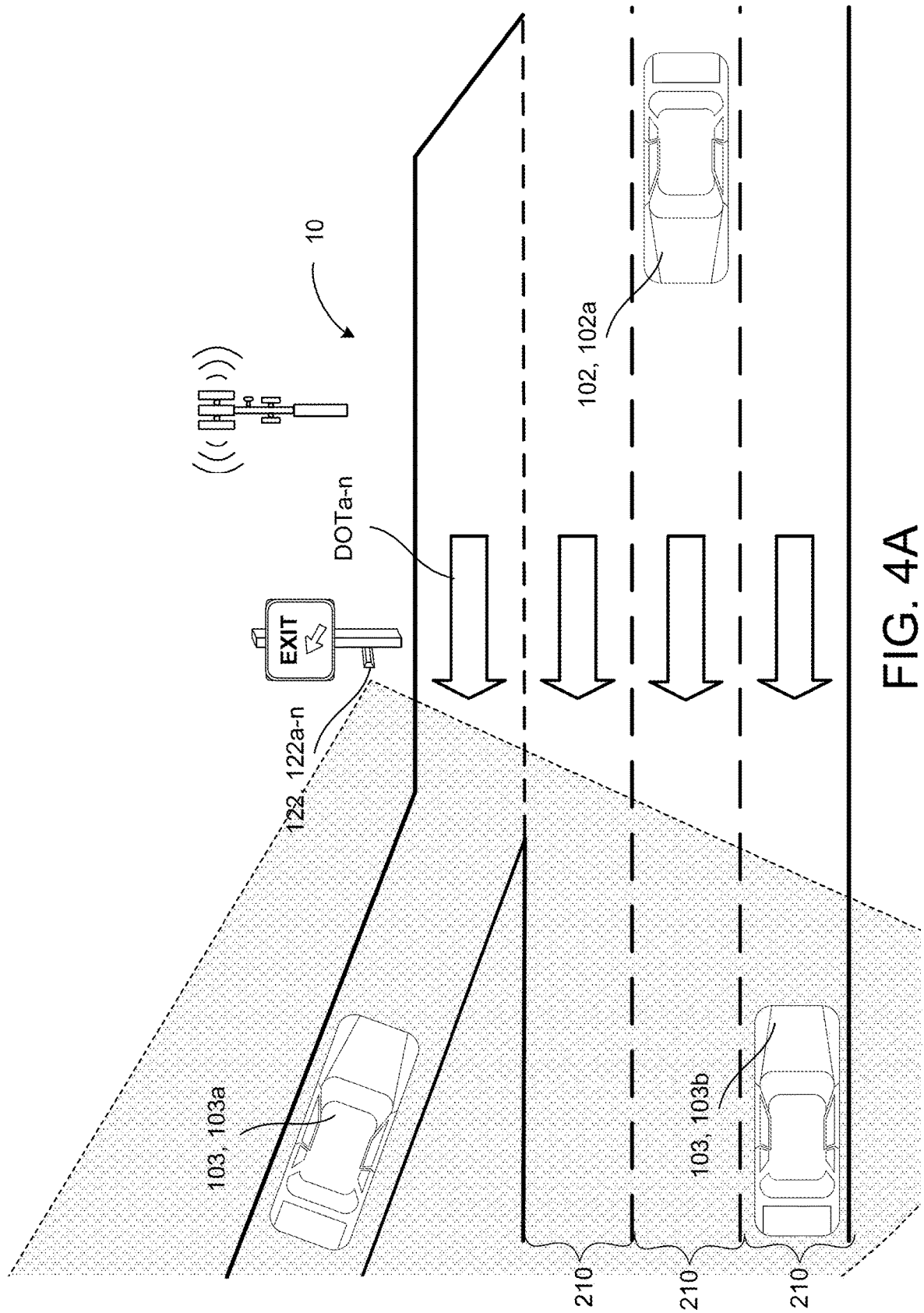
FIG. 4A is a schematic view of a first exemplary detected warning scenario based on the heat map shown in FIG. 2A.
Figure 4B:
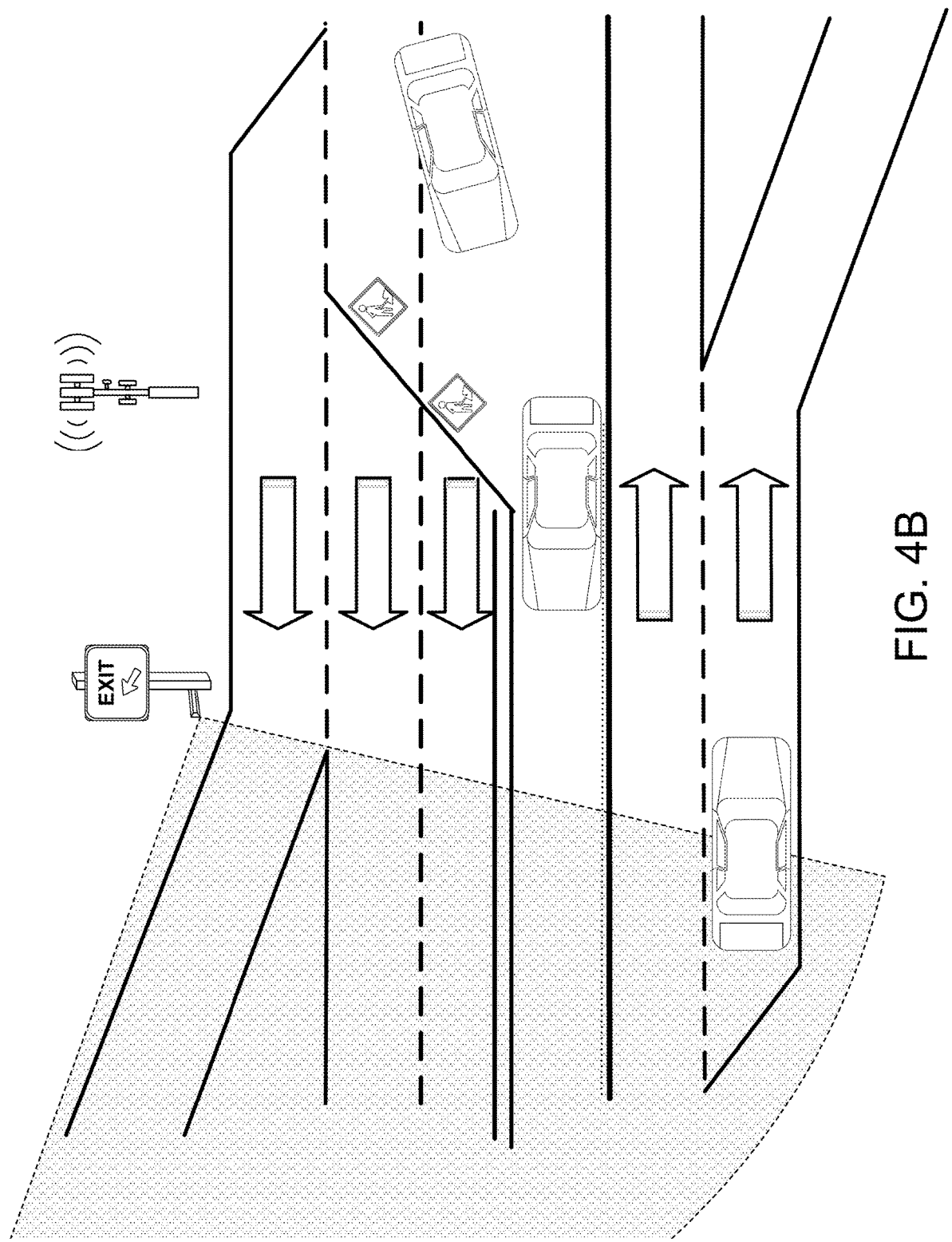
FIG. 4B is a schematic view of a second exemplary detected warning scenario based on the heat map shown in FIG. 2B.
Figure 4C:
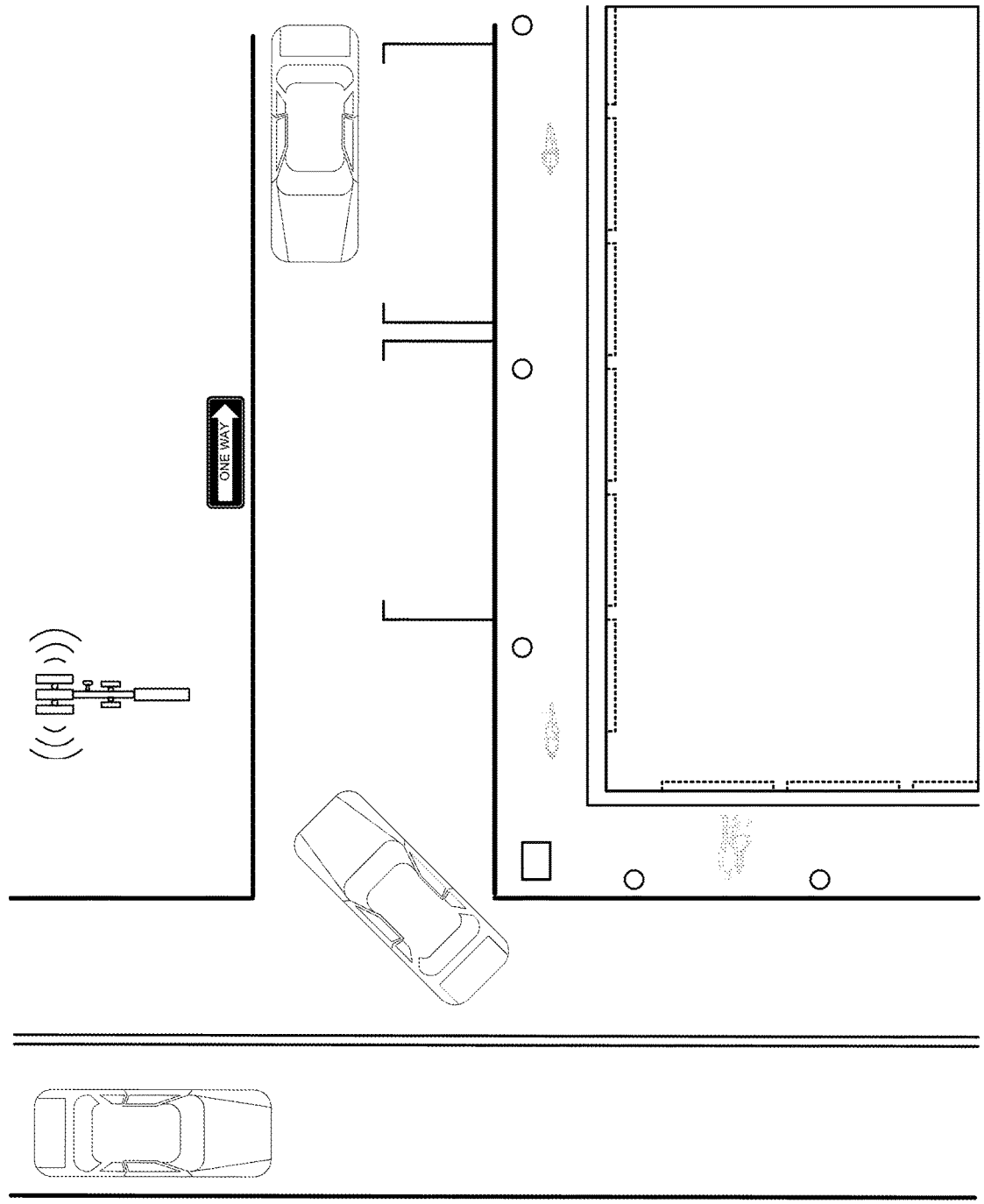
FIG. 4C is a schematic view of a third exemplary detected warning scenario based on the heat map shown in FIG. 2C.

Referring to FIGS. 1-2B, a vehicle-traffic system 100 includes a traffic monitoring system 110 that includes a computing device (or hardware processor) 112 (e.g., central processing unit having one or more computing processors) in communication with non-transitory memory or hardware memory 114 (e.g., a hard disk, flash memory, random-access memory) capable of storing instructions executable on the computing processor(s) 112. The traffic monitoring system 110 includes a sensor system 120. The sensor system 120 includes one or more sensors 122a-n positioned at one or more roads or road intersections, herein after referred to as a monitor area 10, and configured to sense one or more traffic participants 102, 102a-n. Traffic participants 102, 102a-n may include, but are not limited to, vehicles 102a, pedestrians and bicyclists 102b, user devices 102c. In some implementations, the user device 102c is any computing device capable of communicating with the sensors 122. The user device 102c may include, but is not limited to, a mobile computing device, such as a laptop, a tablet, a smart phone, and a wearable computing device (e.g., headsets and/or watches). The user device 102c may also include other computing devices having other form factors, such as a gaming device. User devices 102c that are located within vehicles 102, 102a-n may be detected by the sensor system 120 and used to communicate with operators and passengers within vehicles 102, 102a-n that do not have capability themselves.

In some implementations, the one or more sensors 122a-n may be positioned to capture data 124 associated with a specific area 10, where each sensor 122a-n captures data 124 associated with a portion of the area 10. As a result, the sensor data 124 associated with each sensor 122a-n includes sensor data 124 associated with the entire area 10. In some examples, the sensors 122a-n are positioned within the monitor area 10, for example, each sensor 122a-n is positioned on a corner of the monitored area 10 such as an intersection, roadway, freeway, etc. to view the traffic participants 102 or supported by a traffic light. The sensors 120 may include, but are not limited to, Radar, Sonar, LIDAR (Light Detection and Ranging, which can entail optical remote sensing that measures properties of scattered light to find range and/or other information of a distant target), HFL (High Flash LIDAR), LADAR (Laser Detection and Ranging), cameras (e.g., monocular camera, binocular camera). Each sensor 120 is positioned at a location where the sensor 120 can capture sensor data 124 associated with the traffic participants 102, 102a-c at the specific location. Therefore, the sensor system 120 analyses the sensor data 124 captured by the one or more sensors 122a-n. The analysis of the sensor data 124 includes the sensor system 120 identifying one or more traffic participants 102 and determining one or more attributes 106, 106a-n associated with each traffic participant 102. The traffic attributes 106, 106a-n, may include, but are not limited to, the location of the traffic participant 102 (e.g., in a coordinate system including the direction of travel), a speed associated with the traffic participant 102, a type of the traffic participant 102 (e.g., vehicles 102a, pedestrians and bicyclists 102b, user devices 102c, user device 102c located in a vehicle 102), and other attributes of each traffic participant 102 within the monitor area 10.

The traffic monitoring system 110 executes a heat map generator 130 that generates a heat map 200, 200a, as shown in FIGS. 2A and 2B, based on the analyzed sensor data 126 received from the sensor system 120. Therefore, the sensors 122a-n capture sensor data 124 associated with the monitor area 10, such as a road or intersection, then the sensor system 120 analyses the received sensor data 124. Following, the heat map generator 130 determines a traffic heat map 200a of the respective area based on the analyzed sensor data 126. The heat map 200a is based on an occurrence of an object or traffic participant 102, 102a-c within the specific area 10. As the number of traffic participants 102, 102a-c increases within the area 10, a heat-index associated with the area 10 increases as well. As shown in FIGS. 2A and 2B, a path of each traffic participant 102, 102a-c is shown, and the heat-index of each path increases when the number of traffic participants 102, 102a-c taking that path increases. No a-priori information about the area 10 is needed by the traffic monitoring system 110 since all relevant information, such as sensor metadata (i.e., sensor location, for example, a relative position of each sensor 122, 122a-n in a coordinate system and/or with respect to one another) associated with each sensor 122, 122a-n are known and the received sensor data 124 is captured and collected. Therefore, the traffic monitoring system 110 generates the heat map 200a to understand the geometry and geography of the area based on the received sensor data 124 associated with each of the sensors 122a-n.

Vehicle-to-everything (V2X) communication is the flow of information from a vehicle to any other device, and vice versa. More specifically, V2X is a communication system that includes other types of communication such as, V2I (vehicle-to-infrastructure), V2V (vehicle-to-vehicle), V2P (vehicle-to-pedestrian), V2D (vehicle-to-device), and V2G (vehicle-to-grid). V2X is developed with the vision towards safety, mainly so that the vehicle is aware of its surroundings to help prevent collision of the vehicle with other vehicles or objects. In some implementations, the traffic monitoring system 110 communicates with the traffic participants 102 via V2X by way of a V2X communication 104, and the traffic participant 102 sends one or more attributes of the traffic participant 102 to the traffic monitoring system 110 by way of the V2X communication 104. Therefore, the traffic monitoring system 110 may analyze the V2X communication to determine one or more attributes 106 associated with the respective traffic participant 102.

In some examples, the traffic monitoring system 110 is in communication with a remote system 150 via the network 140. The remote system 150 may be a distributed system (e.g., a cloud environment) having scalable/elastic computing resources 152 and/or storage resources 154. The network

140 may include various types of networks, such as a local area network (LAN), wide area network (WAN), and/or the Internet. In some examples, the traffic monitoring system 110 executes on the remote system 150 and communicates with the sensors 122 via the network 140. In this case, the sensors 122 are positioned at the monitor area 10 to capture the sensor data 124. Additionally, in this case, the traffic participants 102 may communicate with the traffic monitoring system 110 via the network 140, such that the traffic participants 102 send the traffic monitoring system 110 one or more attributes 106 associated with the traffic participant 102.

Learning Monitor Area Attributes from Sensor Data

In some implementations, the heat map generator 130 learns patterns of traffic participants 102, 102*a-c* based on the analyzed sensor data 126 received from the sensor system 120 (including the attributes 106 associated with each traffic participant 102). Additionally, in some examples, the heat map generator 130 determines a map of the area 10 based on the analyzed sensor data 126. For example, the heat map generator 130 determines a vehicle lane/pathways 210, 210*a-n*, a pedestrian lane 220, a designated and/or common pedestrian crosswalk, or other areas 230 based on an average traffic participant attributes 106 in those lane limits by considering an occupancy probability threshold and cell movement probabilities. The heat map generator 130 may divide the heat map 200*a* into cells, and cell movement is indicative of a traffic participant 102 moving from one cell to another adjacent cell. The heat map generator 130 identifies one or more boundaries, such as a traffic lanes 210, 210*a-n* (e.g., left, straight, right), a pedestrian lane or a sidewalk, a cycling lane (not shown), etc. based on the received sensor data 124. For example, the traffic monitoring system 110 may determine a boundary to be a traffic lane 210 based on a speed of the traffic participant 102 (e.g., the speed of the traffic participant 102 determined based on the sensor data 124 as one of the participant attributes 106).

In some examples, the heat map generator 130 generates the heat map 200*a* and divides the heat map 200*a* into cells (not shown). Some cells may be associated with cell attributes, such as crosswalk, pedestrian traffic light, cyclist lane, vehicle lane.

In some implementations, by monitoring the intersection 10, the heat map generator 130 can identify traffic direction for each of the zones 210, 210*a-n*. For example, the heat map generator 130 may monitor the position and speed of traffic participants 102, 102*a-n*, over a period of time and identify the number of traffic lanes, and how many go in each direction. Further, if the heat map generator 130 observes a traffic participants 103*a* travelling in the wrong direction within the monitor area 10, the heat map generator 130 may decide that traffic participant 103*a* is travelling in the wrong direction.

However, if the heat map generator 130 observes the repeated occurrence of traffic participants 103, 103*a-n* travelling in the wrong direction over a time period of time at the same part of the monitor area 10, the heat map generator 130 may decide that traffic lane 210, 210*a-n* has changed direction, e.g. due to construction. The heat map generator 130 may communicate the information with the traffic participants 103, 103*a-n* that are entering a traffic lane 210, 210*a-n* in the wrong direction, whether such traffic lane 210, 210*a-n* is usually or temporarily in that direction. The heat map generator 130 may also communicate the information with the traffic participants 102, 102*a-n* that are already in the traffic lane 210, 210*a-n* in the correct direction that a traffic participate 103*a* is approaching from the wrong direction of travel DOTa-n.

The heat map generator 130 may store the heat map 200*a* in hardware memory 114 and continuously update the heat map 200*a* while receiving sensor data 124. Additionally, the heat map generator 130 analyses the heat map 200*a* over time and generates traffic data and traffic patterns associated with each class of traffic participants 102 based on the stored heat maps 200. In some examples, the heat map generator 130 analyses the traffic data and detects occurrences such as wrong travel direction of a traffic participant 103*a* within the monitor area 10.

In some implementations, the heat map generator 130 determines that the travel direction DOTa-n of traffic participants 102 is different from a pattern of the traffic participants 102 previously identified (by the heat map generator 130 as stored in the memory 114). For example, the heat map generator 130 receives analyzed data 126 associated with an intersection 10. The heat map generator 130 determines that if the travel direction DOTa-n of vehicles 103*a* currently driving in the monitored area 10 is different than a previously identified direction of vehicles 102, 102*a-n*, then the heat map generator 130 may determine that such an occurrence is a wrong-way driver 103*a*.

Generating the Heat Map Based on the Sensor Data

In some implementations, the heat map generator 130 analyses the received sensor data 124, 126 to monitor traffic and generate traffic patterns for the area 10. In addition, the heat map generator 130 may identify a traffic participant 102 as a vehicle 102*a*. The heat map generator 130 may generate the heat map 200*a* based on the type of traffic participant 102, for example, a vehicle heat map or a pedestrian heat map. The heat map generator 130 may also generate a heat map 200*a* including all traffic participants 102 which shows the classes of traffic participants 102.

In some examples, the traffic monitoring system 110 receives the sensor data 124 and the heat map generator 130 determines an average of the attributes of the moving traffic participants 102 that results in generating the heat map 200*a*. Moreover, the heat map generator 130 determines the average (and sigma) speed of each one of the traffic participants 102, the average (and sigma) acceleration of each one of the traffic participants 102, and existing stationary objects to determine the occupancy probability of the traffic participant 102 within each cell.

The heat map generator 130 may receive sensor data 124 associated with each traffic participant 102, 102*a-c* and associate attributes to each traffic participants 102. In some examples, the heat map generator 130 stores the received sensor data 124 and/or the analyses sensor data 126 (including the attributes 106) in the hardware memory 114. The heat map generator 130 may then execute a regression model on the hardware processor 112 in communication with the memory 114 to predict the position of each of the traffic participants 102, 102*a-c* in the monitor area 10 at a specific time. The regression model may predict the position of the traffic participants 102, 102*a-c* within a cell of the identified grid and or the movement of the traffic participant 102 towards a specific cell or an adjacent cell. The cell-based approach executed by the heat map generator 130 helps in estimating the probability of a traffic participant 102, 102*a-n* moving to an adjacent cell.

Overlaying Sensor Data on the Heat Map

While the filtered sensor data is first used to generate the heat map, as described above, once the heat map is established current sensor data can be overlaid on the heat map to detect a vehicle 103, 103a-n traveling in a wrong direction, as described herein.

The sensor data has information for a specific vehicle 103a including the vehicle velocity Va, and the location of the vehicle 103a including the direction of travel, on the heat map 200a. By tracking the vehicle position and speed the system 10 can determine the probability that the vehicle is traveling in the wrong direction for the travel lane 210a-n that it is currently occupying.

Other conclusions may also be drawn by the hardware based on the various data. For example, if vehicles 103a-n are repeatedly determined with high probability to be traveling in the wrong direction for a travel lane 210, the system 110 may begin to repeatedly lower the probability until sufficient sensor data has been collected to update the travel direction DOTa-n on the heat map 200a. For example, if construction routes traffic down a travel lane 210a-n that is typically in the other direction at the beginning the heat map 200a will be in usual direction of travel DOTa-n, once it updates the heat map 200a will be consistent with the temporary direction of travel DOTa-n. In this instance, the system 110 provide this information to vehicles 102, 102a-n that that travel lane is not matching planned data which is usually occurring. The same process will occur in reverse when the travel lane 210a-n resumes the usual planned direction of travel DOTa-n.

Figure 5:
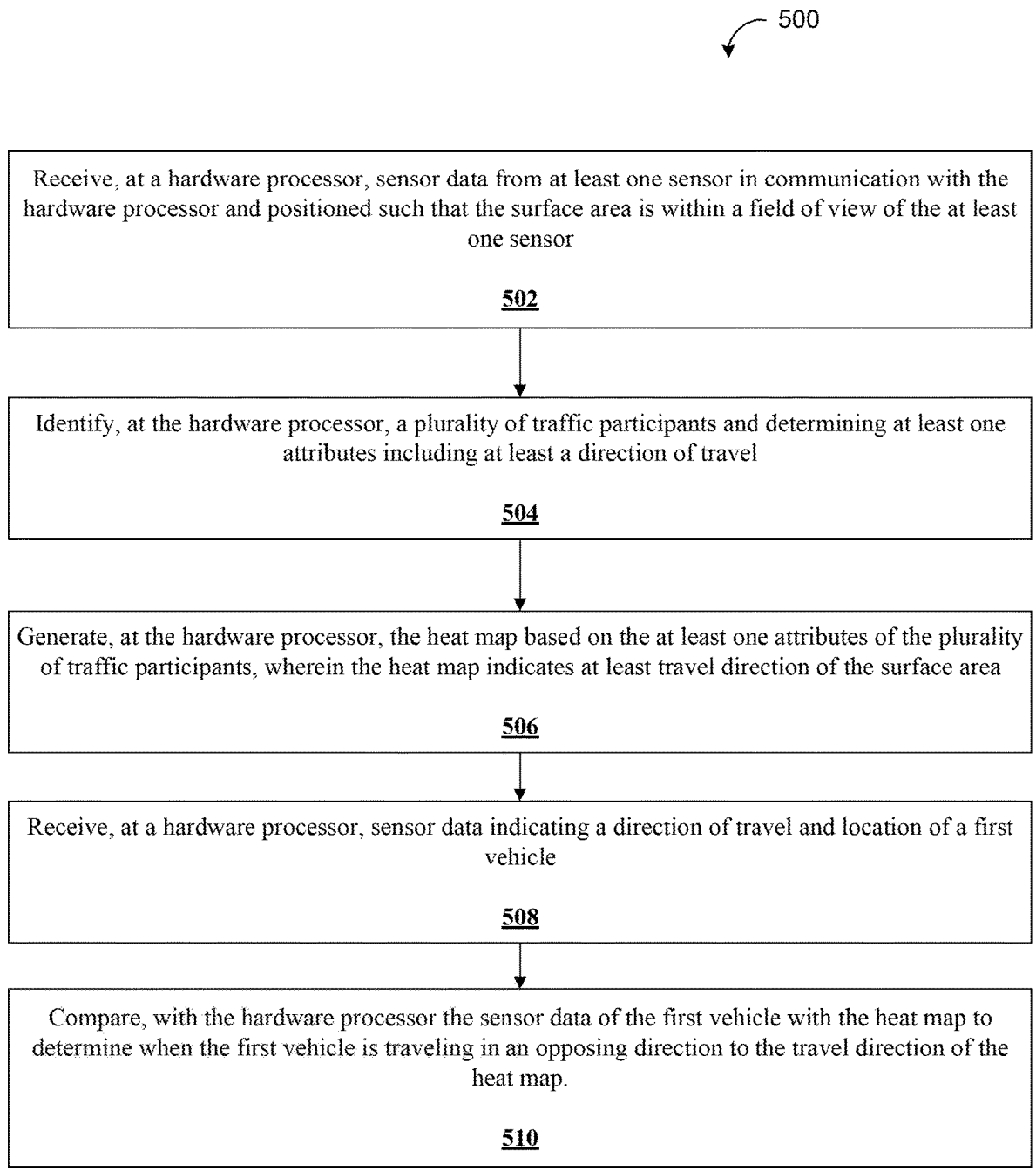
FIG. 5 is a schematic view of an exemplary method for generating a heat map for the vehicle-traffic system described herein.

FIG. 5 provides an example arrangement of operations for a method 500 for generating a heat map 200 of a monitor area 10 using the system 100 of FIGS. 1-2C. At block 502, the method 500 includes receiving, at a hardware processor 112, sensor data 124 from one or more sensors 122 in communication with the hardware processor 112 and positioned such that the surface area 10 is within a field of view of the one or more sensors 122. The attributes including at least a direction of travel.

At block 504, the method 500 includes generating, at the hardware processor 112, the heat map 200a based on the one or more traffic participants 102, 102a-n and sensor data. The heat map 200a indicates at least travel direction of the surface area.

At block 506, monitoring sensor data to identify one or more traffic participants and their attributes. In some examples, the one or more attributes 106, 106a-n includes a direction of travel of each one of the traffic participants 102, 102a-n.

At block 508, receiving, at the hardware processor 12, sensor data indicating a speed and location of a first vehicle.

At block 510, comparing the sensor data of the first vehicle to the direction of travel of the heat map to determine a probability that the first vehicle is travelling in an opposing direction of travel to the heat map 200a.

In some implementations, the method 500 also includes identifying areas of the heat map that are traffic lanes and the direction of travel for each traffic lane.

Figure 6:
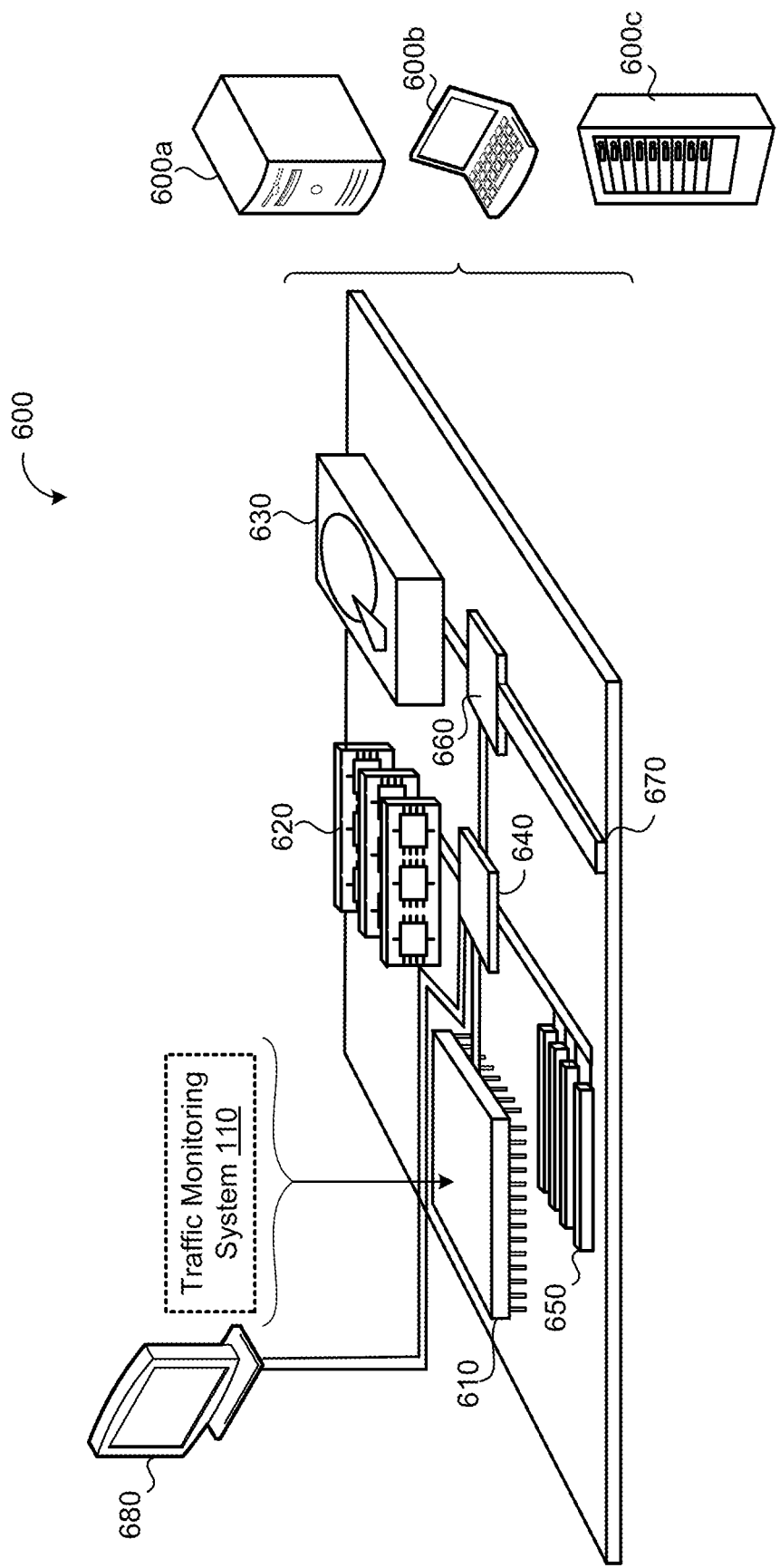
FIG. 6 is a schematic view of an example computing device executing any system or methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to low speed bus 670 and storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high-speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and low-speed expansion port 670. The low-speed expansion port 670, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method for determining a wrong direction of travel of a traffic participant using a heat map of a surface area, the method comprising:
    receiving, at a hardware processor, sensor data from at least one sensor in communication with the hardware processor and positioned such that the surface area is within a field of view of the at least one sensor;
    identifying, at the hardware processor, a plurality of traffic participants and a direction of travel of the plurality of traffic participants;
    generating, at the hardware processor, the heat map of the direction of travel of the plurality of traffic participants of the surface area;
    receiving, at a hardware processor, sensor data indicating a direction of travel and a location of the traffic participant; and
    determining, with the hardware processor, the traffic participant is traveling in an opposing direction to the direction of travel of the plurality of traffic participants based on the direction of travel and the location of the traffic participant and the heat map of the direction of travel of the plurality of traffic participants.

2. The method of claim 1, further comprising providing a warning to the plurality of traffic participants that indicates the traffic participant is traveling in the opposing direction to the travel direction of the plurality of traffic participants.

3. The method of claim 1, further comprising providing a warning to the traffic participant that indicates the traffic participant is traveling in the opposing direction to the travel direction of the plurality of traffic participants.

4. The method of claim 1, further comprising updating the heat map to reflect a new second direction of travel of the plurality of traffic participants.

5. The method of claim 1, wherein the heat map comprises multiple zones of the surface area within the field of view, and
    wherein each zone of the multiple zones is assigned a direction of travel on the heat map.

6. The method of claim 5, further comprising determining a zone of the multiple zones in which the traffic participant is located based upon the sensor data,
    wherein the direction of travel of the traffic participant is compared to zone data on the heat map that corresponds to the location of the traffic participant.

7. A traffic monitoring system comprising:
    a hardware processor; and
    hardware memory in communication with the hardware processor, the hardware memory storing instructions that when executed on the hardware processor cause the hardware processor to perform operations comprising:
    receiving, at a hardware processor, sensor data from at least one sensor in communication with the hardware processor and positioned such that the surface area is within a field of view of the at least one sensor;
    identifying, at the hardware processor, a plurality of traffic participants and a direction of travel of the plurality of traffic participants;
    generating, at the hardware processor, the heat map of the direction of travel of the plurality of traffic participants of the surface area;
    receiving, at a hardware processor, sensor data indicating a direction of travel and a location of a traffic participant; and
    determining, with the hardware processor, the traffic participant is traveling in an opposing direction to the direction of travel of the plurality of traffic participants based on direction of travel and the location of the traffic participant and the heat map of the direction of travel of the plurality of traffic participants.

8. The system of claim 7, wherein the instructions that when executed on the hardware processor cause the hardware processor to perform operations further comprising providing a warning to the plurality of traffic participants that indicates the traffic participant is traveling in the opposing direction to the travel direction of the plurality of traffic participants.

9. The system of claim 7, wherein the instructions that when executed on the hardware processor cause the hardware processor to perform operations further comprising providing a warning to the traffic participant that indicates the traffic participant is traveling in the opposing direction to the travel direction of the plurality of traffic participants.

10. The system of claim 7, wherein the instructions that when executed on the hardware processor cause the hardware processor to perform operations further comprising updating the heat map to reflect a new second direction of travel of the plurality of traffic participants.

11. The system of claim 7, wherein the instructions that when executed on the hardware processor cause the hardware processor to perform operations further comprising defining multiple zones of the surface area within the field of view,
wherein each zone of the multiple zones is assigned a direction of travel on the heat map.

12. The system of claim 7, wherein the instructions that when executed on the hardware processor cause the hardware processor to perform operations further comprising determining a zone of the multiple zones in which the traffic participant is located based upon the sensor data,
wherein the direction of travel of the traffic participant is compared to zone data on the heat map that corresponds to the location of the traffic participant.

* * * * *